United States Patent [19]

Bernett

[11] 4,104,452

[45] Aug. 1, 1978

[54] VINYL POLYMER-FLUOROALKYLETHER OLIGOMER COMPOSITION

[75] Inventor: Marianne K. Bernett, Alexandria, Va.

[73] Assignee: The United States of America as represented by the Secretary of the Navy, Washington, D.C.

[21] Appl. No.: 839,946

[22] Filed: Oct. 6, 1977

[51] Int. Cl.$^2$ .......................... C08K 5/06; C08K 5/20; C08K 5/42
[52] U.S. Cl. ........................................ 526/3; 428/421; 428/441; 428/442; 428/516; 428/517; 526/5; 526/6; 526/342; 526/343; 526/346
[58] Field of Search ..................................... 526/3, 5, 6

[56] References Cited

U.S. PATENT DOCUMENTS

| | | | |
|---|---|---|---|
| 3,472,894 | 10/1969 | Bartlett | 260/561 |
| 3,555,089 | 1/1971 | Bartlett | 260/561 |
| 3,621,059 | 11/1971 | Bartlett | 260/561 HL |

*Primary Examiner*—Stanford M. Levin
*Attorney, Agent, or Firm*—R. S. Sciascia; Philip Schneider; Thomas McDonnell

[57] ABSTRACT

A vinyl polymer-fluoroalkylether oligomer composition useful as a structural material, filament, adhesive, or abhesive which comprises:
a vinyl polymer selected from the class consisting of polyvinylchloride, polyvinylidene chloride, copolymers of vinylidene chloride and vinyl chloride, copolymers of vinylidene chloride and acrylonitrile in proportions in which vinylidene chloride is at least 70% by weight, polymethylmethacrylate, and polystyrene; and a fluoroalkylether oligomer of the general formula:

$$F[C(CF_3)F-CF_2-O]_m-C(CF_3)F-CO-R$$

wherein $m$ is an integer from 4 to 10 and R is further defined by the formulas:

$$OR^1(OR^2)_n OR^2 \quad (1)$$

wherein $R^1$ is an alkyl radical having from 1 to 3 carbon atoms, $R^2$ is an alkyl radical having from 1 to 3 carbon atoms, and $n$ is an integer from 3 to 10, $$OR^3 \quad (2)$$

wherein $R^3$ is an alkyl having from 1 to 10 carbon atoms, $$N-(C_pH_{2p}OH)_2 \quad (3)$$

wherein $p$ is an integer from 2 to 4, $$N(CH_2)_qCH_3 \quad (4)$$

wherein $q$ is an integer from 2 to 8, and $$N(R^4)C_sH_{2s}N^+(R^5)(R^6)(R^7)A^- \quad (5)$$

wherein $R^4$ is hydrogen or an alkyl having 1 to 3 carbon atoms, $R^5$ and $R^6$ and $R^7$ are alkyl groups having 1 to 3 carbon atoms, $s$ is an integer from 1 to 3, and A is a sulfonate or halide; said fluoroalkylether oligomer being incorporated therein in an amount sufficient to provide a surface of lower energy thereon.

8 Claims, No Drawings

VINYL POLYMER-FLUOROALKYLETHER OLIGOMER COMPOSITION

BACKGROUND OF THE INVENTION

The invention pertains generally to polymer modification by additives and particularly to the lowering of surface energy of vinyl polymers by the inclusion therein of a small amount of a low surface-energy oligomer.

While Teflon is an excellent material with an extremely low surface-energy, it is not without disadvantages. Teflon cannot be extruded and it is expensive. Storage of Teflon sheets is complicated by Teflon's tendency to bow. Many vinyl compounds are also excellent materials and they do not have the above disadvantages of Teflon. Unfortunately, the surface energy of these compounds are much higher than Teflon. Thus, if the surface energy of these vinyl compounds could be lowered, their wettability would decrease and thus they would have many additional uses as, e.g., films, abhesives, filaments, and structural materials.

Since the surface energy of a polymer is dependent upon the chemical constitution of the surface layer of the polymer, one technique for decreasing the wettability of a polymer is modifying the chemical composition of the surface. Desirably, the alteration is accomplished without proportionately altering the bulk properties of the polymer.

The most successful modification of the surface composition of solid vinyl polymers has been obtained by the adsorption of partially fluorinated esters at the polymer-air interface during the formation of this interface. These additives were compounds of comparatively small molecules, and some were crystalline. Additives of those types provided limited benefit due to poor resistance to abrasion of the surface and to poor ability to migrate to the surface of the polymer after the surface has been worn, i.e., to poor self-healing ability.

SUMMARY OF THE INVENTION

It is therefore an object of this invention to lower the surface energy of vinyl polymers without altering the bulk properties of the polymer.

A further object of this invention is to improve the durability of the modified polymer surface.

Another object of this invention is to increase the self-healing characteristic of the modified polymer surface.

These and other objects are achieved by the inclusion in a vinyl polymer of fluoroalkylether oligomers having an organophobic portion consisting of highly fluorinated chains and attached thereto by polar connecting links various organophilic moieties, said moieties are sufficiently long to enable the oligomer to remain entrapped within the host polymer and thus not be easily abraded from the surface, have a polar hydrophilic or oleophilic endgroup to provide good adsorption to the host polymers, are a liquid or soft solid, are sufficiently mobile to reach and repair the interfaces, and are compatible with and dispersible in the vinyl polymer.

DETAILED DESCRIPTION OF THE INVENTION

A number of fluoroalkylether oligomers have been found to be excellent surface modifiers. The oligomers are summarized by the general formula:

$$F[C(CF_3)F-CF_2-O]_m-C(CF_3)-F-CO-R$$

wherein $m$ is an integer from 4 to 10 and preferably from 7 to 9 and R is further defined by the formulas:

$$OR^1(OR^2)_nOR^2 \qquad (1)$$

wherein $R^1$ is an alkyl radical having from 1 to 3 carbon atoms, $R^2$ is an alkyl radical having from 1 to 3 carbon atoms, and $n$ is an integer from 3 to 10 and preferably is an integer from 4–7;

$$OR^3 \qquad (2)$$

wherein $R^3$ is an alkyl having from 1 to 10 carbon atoms and preferably from 4 to 8;

$$N-(C_pH_{2p}OH)_2 \qquad (3)$$

wherein $p$ is an integer from 2 to 4;

$$N(CH_2)_qCH_3 \qquad (4)$$

wherein $q$ is an integer from 2 to 8 and preferably from 3 to 6;

$$N(R^4)C_sH_{2s}N^+(R^5)(R^6)(R^7)A^- \qquad (5)$$

wherein $R^4$ is hydrogen or an alkyl having 1 to 3 carbon atoms, $R^5$ and $R^6$ and $R^7$ are alkyl groups having 1 to 3 carbon atoms, $s$ is an integer from 1 to 3, and A is a sulfonate or halide, said fluoroalkylether oligomer being incorporated therein in an amount sufficient to provide a surface of lower energy thereon.

The following oligomers show particular promise:

(A) $F[C(CF_3)F-CF_2-O]_9-C(CF_3)F-CO_2CH_2-CH_2(OCH_2-CH_2)_6OCH_3$
(B) $F[C(CF_3)F-CF_2-O]_9-C)CF_3)F-CON(CH_2-CH_2OH)_2$
(C) $F[C(CF_3)F-CF_2-O]_9-C(CF_3)F-CONH(CH_2)_3N^+(CH_3)_3I^-$
(D) $F[C(CF_3)F-CF_2-O]_9C(CF_3)FCO_2C_6H_{13}$
(E) $F[C(CF_3)F-CF_2-O]_9C(CF_3)FCON[(CH_2)_2CH_3]_2$
(F) $F[C(CF_3)F-CF_2-O]_7-C(CF_3)F-CO_2CH_2-CH_2(OCH_2-CH_2)_4OCH_3$
(G) $F[C(CF_3)F-CF_2-O]_5-C(CF_3)F-CON(CH_2-CH_2OH)_2$

The vinyl polymers which may be modified by the additives of this invention are polyvinylchloride, polyvinylidine chloride, copolymers of vinylidines and vinyl chloride, copolymers of vinylidine chloride and acrylonitrile in proportions in which vinylidine is at least 70 weight percent, polymethylmethacrylate, and polystyrene. The additives of the present invention are incorporated in these vinyl polymers by adding them to the polymers in the molten state or in solution in a volatile solvent or to the vinyl monomer before polymerization. An effective amount of additive is from 0.05 weight percent of the total composition weight to the dispersibility limit of the oligomer in the polymer. Quantities in excess of one weight percent do not produce any significant additional lowering of the surface energy. Preferably, an amount from 0.1 to 0.5 weight percent of the additive is used.

In order to demonstrate the effectiveness of the invention, the following examples are given. It is understood that the examples do not limit the disclosure or the claims to follow.

Several vinyl polymers of different surface composition were modified with the following three additives:

(A)  $F[C(CF_3)F\text{—}CF_2\text{—}O]_9\text{—}C(CF_3)F\text{—}CO_2CH_2\text{—}CH_2(OCH_2\text{—}CH_2)_6OCH_3$
(B)  $F[C(CF_3)F\text{—}CF_2\text{—}O]_9\text{—}C(CF_3)F\text{—}CON(CH_2\text{—}CH_2OH)_2$
(C)  $F[C(CF_3)F\text{—}CF_2\text{—}O]_9\text{—}C(CF_3)F\text{—}CONH(CH_2)_3N^+(CH_3)_3I^-$ A polymer representing a surface containing ester groups was poly(methyl methacrylate), PMMA, which had the following properties: $M_n=48,600$, $M_w=115,000$, $[\mu] = 0.2500$ dl/g in acetone, syndiotactic J value $= 95$. A surface consisting essentially of hydrocarbons was represented by polystyrene, PS, $M_w = 230,000$, reprecipitated twice with methanol from methylene chloride. Two polymers representing surfaces containing chlorine atoms were a copolymer of 85 percent poly(vinylidene chloride) and 15 percent poly(vinyl chloride), PVeCl:PVCl, and a copolymer of 80 percent (poly(vinylidene chloride) and 20 percent polyacrylonitrile, PVeCl, where the presence of acrylonitrile improved the solubility characteristics of the polymer without appreciably altering its wetting properties. Smooth surfaces of each polymer with and without additives were obtained by casting the polymer from solutions onto flat smooth substrates of glass, polyethylene, and FEP Teflon to produce films. The preparation comprises perparing separate solutions of each polymer and of each additive, and adding the additive solution to the polymer solution. PMMA and PS individually were dissolved in methylene chloride, in concentrations of 0.013 g solids per ml solvent (PMMA was also prepared in concentrations up to 0.052 g/ml), and PVeCl in tetrahydrofuran, 0.013 g/ml. The solution of the respective additive in hexafluorobenzene, in concentrations of 0.001 g/ml, was then added in the appropriate amount to represent 0.25 percent additive of total solutes. All films were prepared by casting the solution on the flat and clean surface of the substrate, followed by slow evaporation at room temperature for 16 hrs, and evacuation at 50° C for 4 hours. During the slow evaporation, the additives were free to diffuse to the polymer-air interface or the polymer-substrate interface.

The wetting tests were conducted by touching drops of the test liquid to the surface of the modified and unmodified polymer films by means of a fine diameter (about 1 mm) platinum wire. The advancing contact angles on each polymer surface were measured in air with a contact angle goniometer at 22° C and at a relative humidity of about 50%. When the cosine of the contact angle $\theta$ of each member of a homologous series of liquids on a smooth solid low-energy surface is plotted against the surface tension for each of these liquids, a straight line results. The intercept where the contact angle is zero is referred to as the critical surface tension of wetting, $\gamma_c$, for that particular surface. Thus, the higher the contact angle and the lower the $\gamma_c$, the lower the wettability of the particular surface.

EXAMPLE I

Poly(methylmethacrylate)

Cast films of pure PMMA on glass had a $\gamma_c$ of about 40 dyn/cm. When the films contained 0.25% of the additives A, B and C the values of $\gamma_c$ for these films were lowered to 14.8, 14.7 and 14.3 dyn/cm, respectively; the same $\gamma_c$ values were also obtained when the films were cast on PE or FEP. (Table I). Thus, the addition of very small amounts of the fluorinated additives reduced the $\gamma_c$ of PMMA by about 25 dyn/cm. Critical surface energies of such low values indicate the presence of $CF_3$-groups in the outermost surface. The additive, therefore, must have diffused to the film/air interface in a configuration where the molecular portion of the fluorinated backbone chain containing the $CF_3$-groups was oriented into the surface while the oleophilic polar portion was anchored onto the bulk polymer.

EXAMPLE II

Polystyrene

Films of PS cast from solution onto glass slides were transparent and had $\gamma_c$ values of 30 to 33 dyn/cm. When the films contained 0.25 percent of A, B, or C, $\gamma_c$ values were 21.8, 22.4 and 14.1 dyn/cm, respectively. Similar results were obtained from polyethylene and FEP Teflon surfaces. (Table I). Additives A and B were not as effective in lowering $\gamma_c$ of PS as they were of PMMA, while C equalled its effectiveness. The thin portions (~ 1 mil) of each additive-containing film appeared transparent, whereas the portions which remained thicker during evaporation appeared somewhat milky, a result of limited solubility of the polar fluorinated additive in the non-polar hydrocarbon polymer.

EXAMPLE III

Poly(vinylidene chloride) Copolymers

Films from the PVeCl polymer cast on glass, polyethylene, and FEP Teflon had a $\gamma_c$ of 39-44 dyn/cm. When 0.25 percent of additives A, B, or C were added, $\gamma_c$ decreased to 17.3, 17.3, and 15.6 dyn/cm, respectively (Table I). Again, additive C was the most effective, although A and B also decreased $\gamma_c$ considerably. All films were pliable and clear with the exception of an opaque area in the somewhat thicker part (~ 3 mil) of the film containing A.

Table 1

| Comparison of Critical Surface Tensions of Pure Polymer Films with Films Containing 0.25 Percent Additives. | | | |
|---|---|---|---|
| | $\gamma_c$ dyn/cm | | |
| Additive | PS | PMMA | PVeCl |
| none | 30 –35 | 38–40 | 39–42 |
| A | 21.8 | 14.8 | 17.3 |
| B | 22.4 | 14.7 | 17.3 |
| C | 14.1 | 14.3 | 15.7 |

In conclusion, the test results show that all three additives, in concentrations as low as 0.25 percent, effectively lowered $\gamma_c$ of diverse polymers by 10 to 25 dyn/cm, thus indicating that they not only diffused to the polymer/air interface, but also adsorbed at that interface in a desirable orientation with the $CF_2$ and $CF_3$ group outermost. With the exception of C, they were more effective in lowering the surface energy of the polar polymers than of the nonpolar PS. Each additive containing either a highly polar ester or amide group which, in combination with the high fluorine content of the molecule, tends to lower the solubility in nonpolar compounds. The quarternary amine end group in the additive C, however, coupled to a hydrocarbon-compatible-$(CH_2)_3$-chain, provided an adequate adsorption moiety to significantly modify even the surface energy of the nonpolar PS film.

EXAMPLES IV–VI

The vinyl-oligomer compositions of the present invention are excellent adhesives to non-fluorinated low-energy organic surfaces and abhesives to high energy surfaces. The following examples demonstrate these important aspects of the present invention. The adhesion of a film comprising polystyrene and 0.25 weight percent of the total composition of Compound C was tested on glass, polyethylene, and FEP Teflon. The films were cast from solution onto the substrate as before. The contact angle of hexadecane on the film at the film-air interface and at the film-substrate interface after the film has been peeled away from the substrate was measured. Also the contact angle $\theta$ of hexadecane on pure polystyrene is less than 5°. The results are summarized in Table 2.

Table 2

| | | | Contact Angle (°) | | | |
|---|---|---|---|---|---|---|
| Ex. No. | Sub | Time (days) | F/Air | F/Sub | Sub/Air | Adhesion |
| IV | Glass | 0 | 70 | 70 | spread | detach |
| | | 30 | 70 | 67 | — | |
| V | PE | 0 | 70 | 15 | spread | good |
| | | 30 | 70 | 25 | — | |
| VI | FEP Teflon | 0 | 68 | 34 | 50 | poor |
| | | 30 | 68 | 65 | — | |

The test results show that the composition of the present invention are good abhesives to high-energy surfaces such as those of glass and are good adhesives to low-energy, non-fluorinated, organic-polymer surfaces. But the compositions are not good adhesives to fluorinated polymers. The contact angle data show that the compositions of the present invention do effectively lower the wettability of a polymer and that the additives of the compositions do migrate to the film-substrate interface.

An analysis of the compositions of the present invention is reported in more detail in Bernett, M. K. *Oligomeric Fluorinated Additives as Surface Modifiers for Solid Polymers.* In Pol. Eng. & Sci. 17(7): p. 450–5. July, 1977.

Obviously many modifications and variations of the present invention are possible in light of the above teachings. It is therefore to be understood that within the scope of the appended claims the invention may be practiced otherwise than as specifically described.

What is claimed and desired to be secured by Letters Patent of the United States is:

1. A vinyl polymer-fluorolkylether oligomer composition which comprises:
   a vinyl polymer selected from the class consisting of polyvinylchloride, polyvinylidene chloride, copolymers of vinylidine chloride and vinyl chloride, copolymers of vinylidene chloride and acrylonitrile in proportions in which vinylidene chloride is at least 70 percent by weight, polymethylmethylmethacrylate, and polystyrene; and from 0.05 weight percent based on total composition weight to the dispersibility limit of a fluoroalkylether oligomer of the general formula:

$$F[C(CF_3)F-CF_2-O]_m-C(CF_3)F-CO-R$$

wherein $m$ is an integer from 4 to 10 and R is further defined by the formulas:

$$OR^1(OR^2)_nOR^2 \qquad (1)$$

wherein $R^1$ is an alkyl radical having from 1 to 3 carbon atoms, $R^2$ is an alkyl radical having from 1 to 3 carbon atoms, and $n$ is an integer from 3 to 10;

$$OR^3 \qquad (2)$$

wherein $R^3$ is an alkyl having from 1 to 10 carbon atoms;

$$N-(C_pH_{2p}OH)_2 \qquad (3)$$

wherein $p$ is an integer from 2 to 4;

$$N(CH_2)_qCH_3 \qquad (4)$$

wherein $q$ is an integer from 2 to 8; and $$N(R^4)C_sH_{2s}N^+(R^5)(R^6)(R^7)A^- \qquad (5)$$

wherein $R^4$ is hydrogen or an alkyl having 1 to 3 carbon atoms, $R^5$ and $R^6$ and $R^7$ are alkyl groups having 1 to 3 carbonatoms, $s$ is an integer from 1 to 3, and A is a sulfonate or halide, said fluoroalkylether oligomer being incorporated therein in an amount sufficient to provide a surface of lower energy thereon.

2. The composition of claim 1 wherein R is defined by the formula (1):

$$OR^1(OR^2)_nOR^2$$

wherein $R^1$ is an alkyl radical having from 1 to 3 carbon atoms, $R^2$ is an alkyl radical having from 1 to 3 carbon atoms, and $n$ is an integer from 3 to 10.

3. The composition of claim 1 wherein R is defined by the formula (2):

$$OR^3$$

wherein $R^3$ is an alkyl having from 1 to 10 carbon atoms.

4. The composition of claim 1 wherein R is defined by the formula (3):

$$N-(C_pH_{2p}OH)_2$$

wherein $p$ is an integer from 2 to 4.

5. The composition of claim 1 wherein R is defined by the formula (4):

$$N(CH_2)_qCH_3$$

wherein $q$ is an integer from 2 to 8.

6. The composition of claim 1 wherein R is defined by the formula (5):

$$N(R^4)C_sH_{2s}N^+(R^5)(R^6)(R^7)A^-$$

wherein $R^4$ is hydrogen or an alkyl having 1 to 3 carbon atoms, $R^5$ and $R^6$ and $R^7$ are alkyl groups having 1 to 3 carbon atoms, $s$ is an integer from 1 to 3, and A is a sulfonate or halide, said fluoroalkylether oligomer being incorporated therein in an amount sufficient to provide a surface of lower energy thereon.

7. The composition of claim 1 wherein $m$ is an integer from 7 to 9 and R is further defined by the formulas:

$$OR^1(OR^2)_nOR^2 \qquad (1)$$

wherein $R^1$ is an alkyl radical having from 1 to 3 carbon atoms, $R^2$ is an alkyl radical having from 1 to 3 carbon atoms, and $n$ is an integer from 4 to 7;

$$OR^3 \qquad (2)$$

wherein $R^3$ is an alkyl having from 4 to 8 carbon atoms;

$$N-(C_pH_{2p}OH)_2 \qquad (3)$$

wherein $p$ is an integer from 2 to 4;

$$N(CH_2)_qCH_3 \qquad (4)$$

wherein $q$ is an integer from 3 to 6; and $$N(R^4)C_sH_{2s}N^+(R^5)(R^6)(R^7)A^- \qquad (5)$$

wherein $R^4$ is hydrogen or an alkyl having 1 to 3 carbon atoms, $R^5$ and $R^6$ and $R^7$ are alkyl groups having 1 to 3 carbon atoms, $s$ is an integer from 1 to 3, and A is a sulfonate or halide, said fluoroalkylether oligomer being incorporated therein in an amount sufficient to provide a surface of lower energy thereon.

8. The composition of claim 7 wherein said oligomer is from 0.1 to 0.5 weight percent of the total composition weight.

* * * * *